Z. DURKEE.
Car Axle.
No. 549. Patented Jan. 9, 1838.
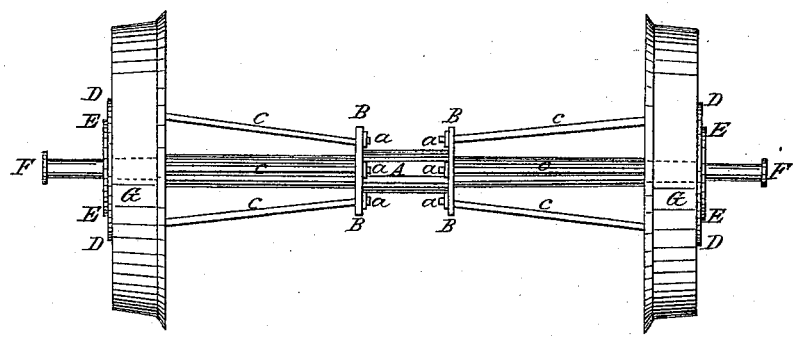
Witnesses:
Inventor:

UNITED STATES PATENT OFFICE.

ZIBA DURKEE, OF PHILADELPHIA, PENNSYLVANIA.

MODE OF STRENGTHENING THE AXLES OF RAILROAD-CARS AND LOCOMOTIVES.

Specification of Letters Patent No. 549, dated January 9, 1838.

*To all whom it may concern:*

Be it known that I, ZIBA DURKEE, of the city of Philadelphia and State of Pennsylvania, have invented a new and useful Improvement Constructed to Strengthen the Axles of Railroad Cars and Locomotives, When the Crank is on the Outside of the Wheel.

In the construction of this improvement, I put upon the axle, such as is in common use, a cylinder which I secure firmly by wedges or by running in melted metal or otherwise. Upon each end of this cylinder I construct circular flanches, extending perpendicularly sufficiently far to admit through, and secure to them the necessary rods. This cylinder is of a length to leave spaces between its ends and the inside of the wheels to admit sundry rods from the wheels of the car, into its flanches in nearly a horizontal position, its ends being at equal distances upon the axle from each wheel. Through and near the outer edge of the flanches I make as many holes as there are rods to be used. I also prepare two circular plates, through each of which, and to correspond with those in the flanches of the cylinder, I make the same number of holes made in them. Through the center of these plates I make a hole, of the same size of the outer ends of the axle, upon which they are placed against the hubs and spokes of the wheels. These plates must be of a size to permit the hole for the reception of the rods, to be made at a point corresponding with the largest part of the hubs so that the rods to be introduced may pass over and close to the periphery of the hubs, to and through the holes in the flanches of the cylinder. I prepare as many rods as there are holes in the circular plates, which may be as many or less than the number of spaces between the spokes of the two wheels, with heads at the outer ends to be counter-sunk in the plates, so as to present a smooth and even surface, with a screw cut on the inner ends, which pass through the flanches of the cylinder. These rods I pass through the circular plates on the ends of the axle between the spokes of the car wheel, over and close to the periphery of the hubs, to and through the holes in the flanches of the cylinder. These rods are then drawn firmly by screw nuts put upon them the inside of the flanches, which bind the plates upon the ends of the axle against the outside of the wheels, connecting them substantially, by the rods, to the cylinder, forming a combination that greatly strengthens the axle and prevents it from breaking, and supports the wheels should an axle break. With this attachment. a smaller axle than those now in use, will answer every purpose. The rods may be of any size or shape the builder may prefer, and must of course be of a length to corespond with the distance from the outside of the plates upon the ends of the axle, to the inside of the flanches of the cylinder, with allowance for the reception of the burrs or nuts. I introduce the shoulders of the axes in the inside of the hubs in a bevel form.

What I claim as my invention and desire to secure by Letters Patent, is—

The within described mode of strengthening the wheels and axles of locomotives and railroad cars, by the combination of the cylinder, plates, and rods, constructed and connected substantially as within described.

ZIBA DURKEE.

Witnesses:
L. C. LUDFOUL,
JONAS P. FAIRLAMB.